Dec. 24, 1935.  U. S. RUSH  2,025,476
DRILL BIT
Filed April 22, 1930

Ulysses S. Rush.
INVENTOR
BY U.S. Rush
ATTORNEY

Patented Dec. 24, 1935

2,025,476

UNITED STATES PATENT OFFICE 2,025,476

DRILL BIT

Ulysses Samuel Rush, Seattle, Wash.

Application April 22, 1930, Serial No. 446,275

2 Claims. (Cl. 255—64)

The objects to be attained by the drill bit which I have invented and which is the subject of this application for Letters Patent, are:—

First: To provide a rock drill bit having separately detachable cutters, any one of which may be quickly removed and replaced by another at the face of the work where it is being used.

Second: To provide a rock drill bit with readily and separately detachable cutters in which the various parts of the bit cooperate to compensate for wear. The cutters are firmly held in the bit in a manner to absorb, distribute and cushion the shock incidental to drilling and to preserve their alignment thereby producing a bit which is less subject to breakage, which will hold their cutting edges longer and therefore cut faster and which will drill a hole which is not fissured or rifled.

These several objects are accomplished by means of a preferred form of my bit disclosed in the drawing forming a part of the present specification but I do not limit myself to such form since my invention expressed in this specification may be embodied in a plurality of forms.

In said drawing like characters of reference are used to designate similar parts throughout the said specification and drawing and in which:—

Figure 1:
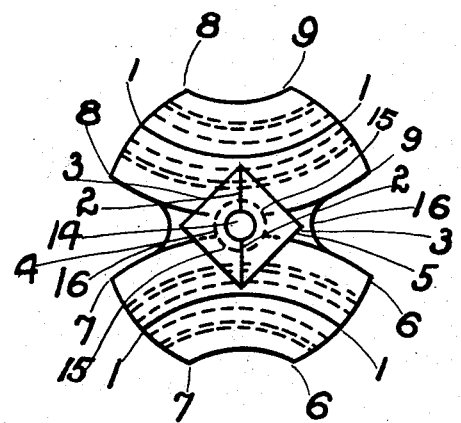
Fig. 1 is a plan of the cutting face of my bit.

Referring to the drawing, Fig. 1, numeral 1—1, designates the cutting edges of the arcuated cutting heads 6—6, 7—7, and 8—8, 9—9. The dotted lines on the arcuated cutting heads between 6—6 and 7—7, and between 8—8 and 9—9, indicate the outline of the grooves and ridges on the sides of the shanks 10, and sockets 12, and also a longitudinal tapering of said shanks and sockets.

Figure 3:
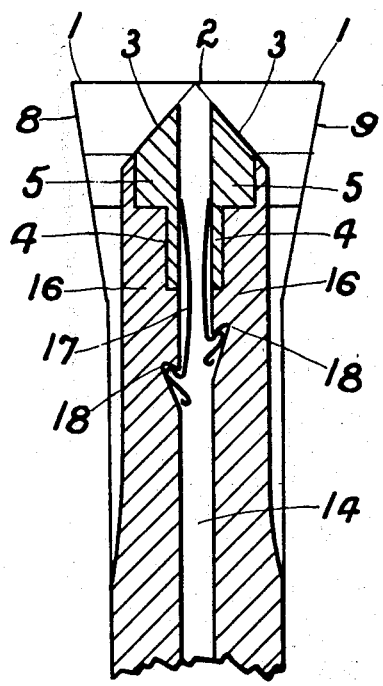
Fig. 3 is a vertical sectional view through the center of the central cutting member 3, transversely of its cutting edges 2—2.

In Figs. 1 and 3, the cutting head of the central cutting member is indicated by 3—3, and the cutting edge by 2—2.

Figure 2:
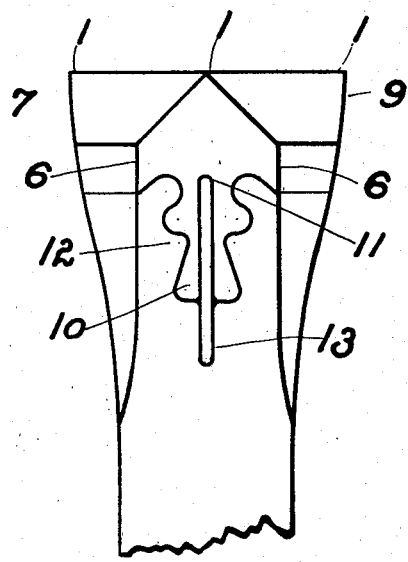
Fig. 2 is a view in side elevation of my bit.

In Figs. 1 and 3, numerals 5—5 indicate the lower portion of the cutting head 3—3 of the central cutting member. Said lower portion 5—5 occupies the space as indicated in Figs. 1 and 3 between the two opposing vertical faces of the cutting heads 6—7 and 8—9. In each of said opposing vertical faces is a vertical circular groove 15—15, Fig. 1. Each of said grooves 15—15 is occupied by a vertical circular ridge located on each of the two sides of said lower portion 5—5 of the cutting head 3—3 of the central cutting member. When said central cutting member is in working position, as shown in Figs. 1 and 3, the arcuated cutting members, 6—7 and 8—9, are thereby locked in working position. Fig. 2, numeral 6, shows the vertical sides of the cutting heads which carry the vertical grooves 15—15.

Shank 4, Figs. 1 and 3, starts as a vertical circular ridge on each of the two vertical sides of the lower portion 5—5 of the central cutting head 3—3 and occupies the vertical circular grooves 15—15. From the bottom of 5—5 downwardly shank 4 is cylindrical and occupies an enlarged portion of fluid passage 14.

Fig. 2 is a view in side elevation of my bit in which 1—1—1 indicate the arcuated cutting edges and 6—6, 7—7, and 8—8, 9—9, indicate the arcuated cutting heads. Their compressible shanks 10 taper longitudinally toward their central slot 11 from the larger end 6—6 of the cutting head to the smaller end 7—7. Likewise the shank 10 of the opposite cutting head tapers from the larger end, 8—8 to the smaller end 9—9.

In Fig. 2 the longitudinally tapering socket of the shank 10 is indicated by numeral 12 which tapers with the shank 10. 13 is a longitudinal expansion slot in the bottom of the socket 12. If greater resilience is desired an expansion slot may be placed near each side in the bottom of socket 12. 11 is a compression slot extending the length and width of the shank 10. Both of said slots 11 and 13 may be packed with any suitable resilient substance to keep out mud or water if desired.

The spring hooks 17, Fig. 3, are suitably fastened to the inside of shank 4 of the central cutter 3—3 and engage notches 18 on either side of the inside walls of fluid passage 14. They hold the central cutter in working position.

Numeral 16—16, Figs. 1 and 3 is the body which carries the fluid passage and in the end of said body the sockets are formed.

Said body, numeral 16—16, may be permanently or detachably affixed as desired to a drill stock or other suitable holder or carrier.

I claim as my invention:

1. In a drill bit of the class described, comprising a stock having transversely affixed sockets at one end, said sockets being longitudinally transverse to said stock and expansible, slotted and longitudinally tapering and suitable for holding the compressible, slotted and longitudinally tapering shanks of separately detachable cutting members, the other end of said stock fastened as desired to any suitable holding means, a fluid passage centrally located in said stock and bit, the outer end of said fluid passage enlarged to form a central socket for the shank of a central and separately detachable cutting member, transversely expansible slotted sockets, longitudinally tapering and oppositely disposed on either side of said central cutting member and having longitudinal wear and shock absorbing and distributing holding grooves and ridges on their sides, said grooves and ridges closely meshing with like grooves and ridges on the sides of the transversely compressible and longitudinally tapering and slotted shanks of separately detachable cutting members each comprising a cutting edge, a cutting head and the aforesaid compressible, slotted and tapering shank extending downwardly from the under side of said cutting head and longitudinally therewith, said cutting head having longitudinal holding grooves on its under side oppositely disposed to either side of said shank and extending longitudinally therewith to hold the upper edges of the aforesaid longitudinal and expansible sockets into which said longitudinal and compressible shank is driven and to absorb and distribute shock and wear on each of said detachable cutting members.

2. A drill bit of the class described comprising a stock having transversely affixed sockets at one end, said sockets being slotted, expansible and longitudinally tapering for holding the longitudinally tapering and transversely compressible shanks of separately detachable cutting members, the other end of said stock fastened as desired to any suitable holding means, a fluid passage centrally located in said stock and bit, the outer end of said fluid passage enlarged to form a central socket for the hollow shank of a separately detachable central cutting member, said hollow shank extending into and non-rotatively and detachably held in said central socket, two oppositely disposed spring hooks fastened to the inside of said hollow shank engage notches in the inside walls of said fluid passage and hold said hollow shank of said central cutting member in place, the outer end of said hollow shank terminating in two cutting heads with their cutting edges in alignment transversely to said fluid passage and oppositely disposed and in alignment on either side thereof, locking means on the hollow shaft of said central cutting member engages locking means on said oppositely disposed and separately longitudinal cutting members locking them in working position.

ULYSSES SAMUEL RUSH.